US010519759B2

(12) United States Patent
    Klie

(10) Patent No.: US 10,519,759 B2
(45) Date of Patent: Dec. 31, 2019

(54) GROWTH FUNCTIONS FOR MODELING OIL PRODUCTION

(71) Applicant: CONOCOPHILLIPS COMPANY, Houston, TX (US)

(72) Inventor: Hector M. Klie, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 134 days.

(21) Appl. No.: 14/685,249

(22) Filed: Apr. 13, 2015

(65) Prior Publication Data

US 2017/0177992 A1    Jun. 22, 2017

Related U.S. Application Data

(60) Provisional application No. 61/983,758, filed on Apr. 24, 2014.

(51) Int. Cl.
| | |
|---|---|
| *G06F 15/18* | (2006.01) |
| *G06N 3/08* | (2006.01) |
| *E21B 43/24* | (2006.01) |
| *G06F 17/50* | (2006.01) |
| *E21B 43/00* | (2006.01) |
| *G06N 20/00* | (2019.01) |

(52) U.S. Cl.
    CPC .......... *E21B 43/2406* (2013.01); *E21B 43/00* (2013.01); *G06F 17/5009* (2013.01); *G06N 20/00* (2019.01); *G06F 2217/16* (2013.01)

(58) Field of Classification Search
    CPC ... G06F 17/5009; G06F 2217/16; G06N 3/08; G06N 5/04; E21B 41/0092; E21B 43/2406; E21B 47/00; E21B 49/00
    See application file for complete search history.

(56) References Cited

U.S. PATENT DOCUMENTS

| | | | |
|---|---|---|---|
| 2005/0096758 A1* | 5/2005 | Takezawa ............ | G05B 13/048 700/44 |
| 2007/0225864 A1* | 9/2007 | Bardi ........................ | F23G 5/50 700/274 |

(Continued)

FOREIGN PATENT DOCUMENTS

WO    2013041670    3/2013

OTHER PUBLICATIONS

Akin, S. 2005. Mathematical modelling of steam-assisted gravity drainage. SPE Reservoir Evaluation and Engineering. 8(5): 372-376.

(Continued)

*Primary Examiner* — Luis A Sitiriche
(74) *Attorney, Agent, or Firm* — Boulware & Valoir

(57) ABSTRACT

The present disclosure describes the use of growth models and data driven models that are combined for quickly and efficiently modeling SAGD reservoir oil production. Growth function surrogate models are used for efficient and reliable reservoir modeling and production forecasting as opposed to CPU intensive simulations based on finite difference models. A data-driven technique can then compare the growth function surrogate model with real field data to find discrepancies and inconsistencies between the two, allowing for an updates and improvements of the growth function model.

18 Claims, 9 Drawing Sheets

(56) References Cited

U.S. PATENT DOCUMENTS

| | | | |
|---|---|---|---|
| 2008/0051649 A1* | 2/2008 | O'Dell | A61B 5/055 600/410 |
| 2009/0119020 A1 | 5/2009 | Kurnik et al. | |
| 2009/0125288 A1* | 5/2009 | Main | E21B 49/00 703/10 |
| 2009/0166033 A1* | 7/2009 | Brouwer | E21B 43/00 166/250.02 |
| 2012/0053984 A1* | 3/2012 | Mannar | G06Q 50/06 705/7.28 |
| 2013/0304679 A1* | 11/2013 | Fleming | G05B 13/027 706/14 |

OTHER PUBLICATIONS

Butler, R.M., and Stephens, D.J. 1981. The gravity drainage of steam-heated heavy oil to parallel horizontal wells. Journal of Canadian Petroleum Technology. 20(2):90-96.

Nukhaev, M., et al., 2006, A New Analytical Model for the SAGD Production Phase. Proc., SPE Annual Technical Conference and Exhibition, Sep. 24-27, San Antonio, Texas, USA.

Reis, J.C. 1992. A steam-assisted gravity drainage model for tar sands linear geometry. Journal of Canadian Petroleum Technology. 31(10): 14-20.

Reis, J.C. 1993. A steam-assisted gravity drainage model for tar sands radial geometry. Journal of Canadian Petroleum Technology. 32(8): 43-48.

Tsoularis A., Analysis of Logistic Growth Models, Res. Lett. Inf. Math. Sci, (2001) 2, 23-46; Available online at http://www.massey.ac.nz/wwiims/~rlims.

Tsoularis A, Wallace J., Analysis of logistic growth models, Math Biosci. Jul.-Aug. 2000;179(1):21-55.

Fekedulegn D., Mac Siurtain M.P., and Colbert J.J. Parameter estimation of nonlinear growth models in forestry. Silva Fennica 1999; 33(4): 327-336.

Franses, Ph.H.B.F. (1994). Fitting a Gompertz curve. Operational Research Society. Journal, 109-113, available online at http://hdl.handle.net/1765/2077http://repub.eur.nl/pub/2077.

Liang, L., "An Analytical Model for Cyclic Steaming of Horizontal Wells," in the Department of Petroleum Engineering, pp. 1-90 (Sep. 2005).

Paine, C. E. T., et al., "How to fit nonlinear plant growth models and calculate growth rates: an update for ecologists," Methods in Ecology and Evolution, vol. 3, pp. 245-256 (2012).

Schepers, A. W., et al., "Comparison of simple neural networks and nonlinear regression models for descriptive modeling of Lactobacillus helveticus growth in pH-controlled batch cultures," Enzyme and Microbial Technology, vol. 26, Issue 5-6, pp. 431-445 (2000).

Banks, R.B Growth and Diffusion Phenomena. Springer Verlag, 1994.

\* cited by examiner a = growth rate
b = variation of a with t
c = 1

GROWTH FUNCTIONS FOR MODELING OIL PRODUCTION

CROSS-REFERENCE TO RELATED APPLICATIONS

This application is a non-provisional application which claims benefit under 35 USC § 119(e) to U.S. Provisional Application Ser. No. 61/983,758 filed Apr. 24, 2014, entitled "GROWTH FUNCTIONS FOR MODELING OIL PRODUCTION," which is incorporated herein in its entirety.

FEDERALLY SPONSORED RESEARCH STATEMENT

Not applicable.

REFERENCE TO MICROFICHE APPENDIX

Not applicable.

FIELD OF THE DISCLOSURE

The disclosure generally relates to modeling of hydrocarbon production, and particularly to the combined use of growth models and data-driven models for reservoir modeling and production forecasting in SAGD or other steam assisted oil production methods.

BACKGROUND OF THE DISCLOSURE

Canada's vast oil sand reserve consists of an estimated 173 billion barrels of oil, ranking Canada as the third largest oil reserve in the world. While it is estimated that some 90% of Canada's oil production will be exclusively from the oil sands by 2030, it should be noted that production of oil from oil sands is not simple. Oils sands are a mixture of sand, water, and bitumen. Bitumen is a thick, sticky form of crude oil, so heavy and viscous (thick) that it will not flow unless heated or diluted with lighter hydrocarbons. When near the surface, bitumen is typically extracted by surface mining. However, as shown in FIG. 1, the nature of the oil sands reserves in Canada has only limited application because most bitumen is located greater than 75 meters below the surface. Consequently, in situ extraction methods have become the predominant method of recovery in Canada.

Mineable area 101, only provides access to 19% of the reserves, the other 81% must be produced in situ 102. Open pit mines 103 use excavators 104 to access oil sands 105. Intermediate in situ 106 for oil sands from 75-200 meters may be accessed via primary production or cold heavy oil production with sand. While oil sands greater than 200 meters are typically accessed via in situ thermal recovery techniques. Steam injection 108 produces a thermal chamber 109 for oil recovery 107.

Conventional approaches to recovering heavy oils such as bitumen often focus on lowering the viscosity through the addition of heat. Commonly used in situ extraction thermal recovery techniques include a number of reservoir heating methods, such as steam flooding, cyclic steam stimulation, and Steam Assisted Gravity Drainage (SAGD).

SAGD is the most extensively used technique for in situ recovery of bitumen resources in the Canadian and Venezuelan deposits and other reservoirs containing viscous hydrocarbons. FIG. 2 displays the typical SAGD system. In SAGD, two horizontal wells 204 and 205 are vertically spaced by 4 to 10 meters (m). The production well 204 is located near the bottom of the pay 201 and the steam injection well 205 is located directly above and parallel to the production well. In SAGD, steam generated 202 by a e.g., a Once-Through Steam Generator (OTSG), is injected continuously 207 into the injection well, where it rises in the reservoir and forms a steam chamber. The heat from the steam reduces the oil's viscosity, thus enabling it to flow down under the pull of gravity to the production well and transported to the surface 208 via pumps or lift gas. The produced oil and water 206 is processed 203 to generate oil.

SAGD is of considerable interest in the oil industry because of the vast amount of bitumen that can be produced. The total amount of yet un-extracted crude bitumen in Alberta, Canada alone is estimated to be about 310 billion barrels ($50 \times 10^9$ m$^3$), which at a production rate of 4,400,000 barrels per day (700,000 m$^3$/d) would last about 200 years. However, SAGD recovery shortcomings are mostly related to geological aspects of the reservoirs that are not fully understood.

Reservoir simulation studies are increasingly being conducted to improve our understanding of reservoir response to steam injection. As such, modeling of SAGD processes has become imperative to optimizing recovery. FIG. 3 displays a recent literature search for the number of publications related to proxies, surrogates and metamodels in the field of oil and gas. Since 2010, there has been an overwhelming increase in publications, especially those geared towards SAGD modeling.

Butler and Stephens (1981) proposed the first SAGD analytical model, which is based on the one-dimensional conduction heat transfer theory ahead of an advancing front and a nonlinear assumption for the viscosity gradient relationship. This model was able to adequately mimic the SAGD process without using geomechanics as part of the physical assumptions. However, as operators are gaining experience with the SAGD process, it is becoming clear that oil sands are anything but homogenous and have tremendous variations in key geological and reservoir properties. For instance, the geomechanical behavior is based on a composition of oil sand grains, which can be densely packed and have an interlocked structure. There is much difficulty in including this information in reservoir modeling.

Many flow simulators are available for predicting SAGD performance and support reservoir management decisions, but are CPU intensive simulations based on finite difference models. Thus, building models, especially 3D models, for e.g. thermal simulation is significantly more complex than for conventional simulations, requiring more computing power, more iteration, and more memory. This is especially true in SAGD where there may be several well pair scenarios. Simulations may take several days and even weeks to complete a particular configuration. Furthermore, the estimation of prediction uncertainties based on reservoir models with long run times is often impractical due to limited statistical data generated from direct full field reservoir simulation runs.

As such, there has been a shift to using "surrogate" or "proxy" models (used interchangeably herein) to perform a full field assessment. These models mimic the behavior of the full simulation model, but are less expensive and less CPU demanding. Surrogate models are usually statistical or mathematical models that approximate an existing system and are considered a reduced version of the simulation model. Generally, these models are built using estimation algorithms to process the response of the system, but they can capture key performance indicators as a function of reservoir uncertainty.

Most solutions to increase turn around time through use of surrogates have relied on variants or extensions to the original analytical model proposed by Butler. Other efforts have tried to explore strictly data driven techniques, such as neural networks or polynomial regressions, instead of analytical models. The main shortcoming of these approaches is the use of strongly restrictive physical assumptions (e.g., homogeneity, 2D solutions, no-interwell interaction) as in the case of Butler's model, or the lack of physical structure, as in the case of data driven techniques.

Thus, there exist a need to develop physics-sound surrogate models that could be proactively used in field operations and lead to more reliable decisions. Ideally, the models would offer faster modeling with full field assessment capabilities, preferably with fast numerical and analytical surrogates as well as allowing for the possibility to inspect "what-if" production scenarios.

SUMMARY OF THE DISCLOSURE

The present disclosure describes the combined use of growth models and data driven models to capture main production performance trends of SAGD and other hydrocarbon recovery processes.

In particular, growth function surrogate models are used for efficient and reliable reservoir modeling and production forecasting as opposed to CPU intensive simulations based on finite difference models. A data-driven technique can then compare the growth function surrogate model with real field data to find discrepancies and inconsistencies between the two, allowing for an updates and improvements of the growth function model.

Thus, the present disclosure relates to a method that aims to apply well known growth models to geological, geometrical and operational factors in hydrocarbon recovery for efficiently and quickly modeling reservoirs and to combine this information with data-driven models for preparing SAGD forecast, control, and planning models.

While the disclosure is focused on SAGD applications, it should be noted that other hydrocarbon recovery methods or other produced hydrocarbons could be modeled with the described method. For instance, the growth function models can be applied to improve forecasting and reserve models currently used in shale gas production or even on conventional scenarios where reservoir connectivity through cumulative curves responses are critical to explain current and future production. Furthermore, since the growth function models are time dependent, they are amendable for performing moderate and long-term predictions.

The advantages of the disclosed modeling method include one or more of the following:
Efficient modeling and forecasting for a quick turnaround of results
Amenable to integration with other surrogate technology such as data driven modeling
Easy to implement and relate to input/control reservoir parameters
Provides effective ways to link steam injection with oil production via growth function parameters
Enables inspection of "what-if" production scenarios
In the absence of production data, growth parameters can be related to physical parameters, which is especially important for "what-if" production scenarios
Addresses computational bottlenecks associated with optimization and uncertainty quantification (UQ) workflows in application fields outside SAGD The preferred analytical models used herein are growth function models. Growth function models are prominently used in biological applications to describe the growth of cells or tumors, as well as population and economic growth, but have heretofore not been used for oil and gas.

There are many types of growth function models that can be used herein, including the Gompertz model, the Gompertz-Laird model, the Chapman-Richards model, the von Bertalanffy model, Richard's nonlinear model, the Logistics model, the saturation kinetics model, the monomolecular model, the exponential model, the Weibull model (to name few), and the many variations and modifications thereof. The growth function chosen for the model will depend on the characteristics of the reservoir and more than one growth function may be necessary for accurate modeling.

For SAGD applications, the rate and shape of the chosen growth function can be correlated to the geological, geometrical, and operational factors that determine the steam chamber's growth and shape. These steam chamber features can then be associated with information such as cumulative production or rates to explain current and future production. Thus, the steam injection can be linked to oil production using the growth function model.

Of all the growth function methods tested herein (logistic, confined exponential, Gompertz), a modified Gompertz model best captured the production performance trends for the SAGD locations actually tested for cumulative oil and cumulative steam predictions. However, the particular growth model used may vary depend on the reservoir characteristics and well status. For instance, different growth models can be mixed to best capture SAGD during the development stages. Adjustments may be needed to improve fitting algorithm, to introduce constraints into the model, and to mix other curve behavior trends.

There is a plethora of growth models specifically designed to describe a particular phenomenon. Given that these models are first introduced here for reservoir applications, the decision of growth model will depend on how close the analogies can be established with a particular production scenario. This will involve associating boundary and initial conditions, growth geometry/topology and growth rates.

In the case of SAGD, models associated with tumor growth (e.g., Gompertz, Schnute and Stannard, Logistic, Richards, Gamma, and Weibull) seem to be the most useful for SAGD modeling since both processes share variable rates (SAGD due to operation/geological conditions whereas tumors according to patient treatment), growth is bounded (SAGD production is limited to initial oil in place whereas tumor may not further growth to removal or patient death), and growth is confined in a predefined space. In the case of hydraulic fracturing, in contrast, growth models associated with traffic, plant growth, plant nutrient or river flow may be the most suitable, since fractures are connected to a main pathway entailed by an intersecting horizontal well.

Once the growth function surrogate is built, a data-driven technique will compare this surrogate with real field data. Date-driven modeling is based on the analysis of data characterizing the system. The data-driven models are black-box models with no relation to the underlying physics of the modeled reservoir. Thus, it can compare real system data (i.e. high-fidelity physics of the actual system) with the growth function surrogate to illustrate discrepancies between them. These discrepancies can be incorporated into the growth function surrogate for improved predictability with minimum prediction error. The end result is a model that can then be defined on the basis of connections between the system state variables (input, internal and output variables) with only a limited number of assumptions about the "physical" behavior of the system.

Many types of data driven modeling techniques exist, such as neural networks, polynomial regression, clustering, principal components analysis, partial least squares, autoregressive integrated moving average (ARIMA), radial basis function (RBF), fuzzy rule-based systems, splines, decision trees, Bayesian networks and support vector machines. Additionally combinations of all these approaches can be added in machine committees or assemble learners, which seek to achieve better predictions from the combination of the aforementioned models.

Choosing a particular model depends on the nonlinear feature of the problem as well as for the amount of data available in space and time that may be used to describe such model. There is not a universal suitable model, in fact, model selection shares the same issues that selecting the best optimization approach: The so-called No Free Lunch Theorem. There are, however, several techniques that help to mitigate the model selection problem: 1) Use the simplest available one that reasonably explains the data/model relationship (Occam's Razor), 2) regularize or constrain the problem, 3) parameter reduction, 4) optimal experimental design or combination of models to generate a much better predictive model (i.e., machine committees).

Both the growth and data driven surrogate models may be specialized according to the given physical situations and be combined to ensure the minimum prediction error is achieved.

The added benefit of using a growth function model with data driven techniques is flexibility. This method can be applied to multiple production settings beyond SAGD because any cumulative production curve can be mapped onto a growth function. Thus, this above method can be utilized for other enhanced oil recovery techniques as well as shale gas production.

The method also has two workflows, one for predicting a well performance using input parameters and one using temporal or historical performance data. Furthermore, the performance data from the model can be inspected and further divided into additional sampling points according to the cumulative curvature changes along time. This will allow for closer inspection of deviating field data. The benefit of this is that it helps to improve the sampling for model training and prediction.

One embodiment of the present disclosure is a method wherein a user inputs information about a hydrocarbon reservoir such as geomechanical, petrophysical, and/or other rock properties and selects one or more parameters to be modeled by the growth function algorithm. Filters can be added to the resulting modeling to smooth out the plot without affecting the general trend of the predictions. Then, data driven techniques can be used to compare the growth model with real field data for an inconsistencies. The growth function model can then be evolved to resolve inconsistencies found by the data driven technique. There are high-order frequency features that won't be necessarily captured by the growth function in more realistic scenarios. In a perfect world, the difference between data and the growth function should obey a Gaussian distribution (white noise). If not, there is some missing physics that may need to be alternatively captured by a data-driven model.

Another embodiment of the present disclosure is a method wherein a user inputs information about a hydrocarbon reservoir and selects one or more parameters to be modeled by one or more growth function algorithms. The resulting information can be combined to form a single surrogate model. Then, data driven techniques can be used to compare the surrogate model with field data for an inconsistencies. The surrogate model can then be evolved to resolve inconsistencies found by the data driven technique. Optional filtering and smoothing steps can be included for both models.

In yet another embodiment, temporal hydrocarbon production data from an enhanced oil recovery process is overlaid with a growth function model to achieve the smallest residual error, as determined by the data-driven technique. The growth function is then used to forecast production.

The invention includes one or more of the following embodiments, in any combination thereof.

A method of predicting a hydrocarbon production from a reservoir, said method comprising i) fitting temporal hydrocarbon production data from an enhanced oil recovery process with a growth function model to achieve the smallest residual error, as determined by a data-driven model, and ii) forecasting hydrocarbon production from said an enhanced oil recovery process.

An improved method of predicting a hydrocarbon production from a reservoir, said method comprising i) inputted reservoir parameters and historical field data into a computer and ii) modeling hydrocarbon production from a reservoir based on said parameters and data, the improvement comprising using a growth function model and data driven model that are combined to form a surrogate model for said modeling step.

A method for predicting a hydrocarbon production from a reservoir comprising: inputting production data for one or more production parameters into a computer; applying a growth function model to said production data, wherein said growth function uses said one or more production parameters; applying a data driven model to a residual of said growth function model; combining said growth function model and said data driven model to form a surrogate model; and predicting a future production of hydrocarbon with said surrogate model.

A method for predicting a future hydrocarbon production from a reservoir comprising: determining a field production level in a hydrocarbon production process by placement of sensors at various stages within the hydrocarbon production process and hydrocarbon-containing reservoir; overlaying a growth function representation that simulates the production level within the hydrocarbon production process based on one or more parameters of said hydrocarbon-containing reservoir on a field production level representation; predicting a future production level within the hydrocarbon production process based on observation of the production growth of the growth function representation overlaid on the field production level representation; determining the discrepancies in said growth function representation and said production level using a data driven representation; and selectively modifying at least one parameter in the hydrocarbon production process based on said data driven representation.

A method for predicting performance in a hydrocarbon production comprising: inputting one or more reservoir physical parameters into a computer; applying a growth function model to said one or more reservoir physical parameters; applying a data driven model to a residual of said growth function model; combining said growth function model and said data driven model to form a surrogate model; and predicting a future production of hydrocarbon with said surrogate model.

A method wherein said growth function model is a tumor growth model, or is selected from logistic, Gompertz, Schnute and Stannard, Logistic, Richards or a variation or combination thereof, or is a modified Gompertz model using Equation 1.

A method wherein said data driven model is selected from neural networks, polynomial regression, clustering, principal components analysis, partial least squares, auto-regressive integrated moving average (ARIMA), ARMAX radial basis function (RBF), fuzzy rule-based systems, and support vector machines.

A method wherein said growth function model is a modified Gompertz growth function model and said data driven model is an ARMAX model.

A method wherein said parameters are geological, geometrical, operational or a combination thereof.

As used herein, "surrogate model" is an engineering method used when an outcome of interest cannot be easily directly measured, so a model of the outcome is used instead. The term describes a low-fidelity model that approximates a high-fidelity simulation model.

As used herein, a "growth curve model" or similar expression refers to a well known class of models that analyze trajectories of cases over time. The word "growth" in growth curve models reflects the origin of these procedures in the biological sciences, whereby the organisms studied typically grew over time, and a separate growth trajectory could be fit to each organism. With the spread of these techniques to the social and behavioral sciences, the term growth may be less appropriate, and there is some tendency to refer to these models as latent curve models or latent trajectory models.

As used herein a "modified Gompertz model" is a type of growth model that is derived from the Gompertz curve or Gompertz function, named after Benjamin Gompertz.

As used herein, a "Radial Basis Function" or "RBF" means a real-valued function whose value depends only on the distance (e.g. Euclidean) from the origin or some alternative point designated as the center.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| ANN | Artificial Neural Network |
| ARIMA | auto-regressive integrated moving average |
| ARMAX | auto-regressive moving average with |

-continued

| ABBREVIATION | TERM |
| --- | --- |
| | exogenous inputs |
| BHP | Bottom Hole Pressure |
| CSOR | Cumulative steam to oil ratio |
| CumOil | Cumulative oil |
| CumSteam | Cumulative steam |
| DM | Data Mining |
| HM | History Matching |
| MCMC | Markov Chain Monte Carlo. |
| ML | Machine Learning |
| PSO | Particle Swarm Optimization |
| RBF | Radial basis function network |
| UQ | uncertainty quantification |

DETAILED DESCRIPTION

Figure 1:
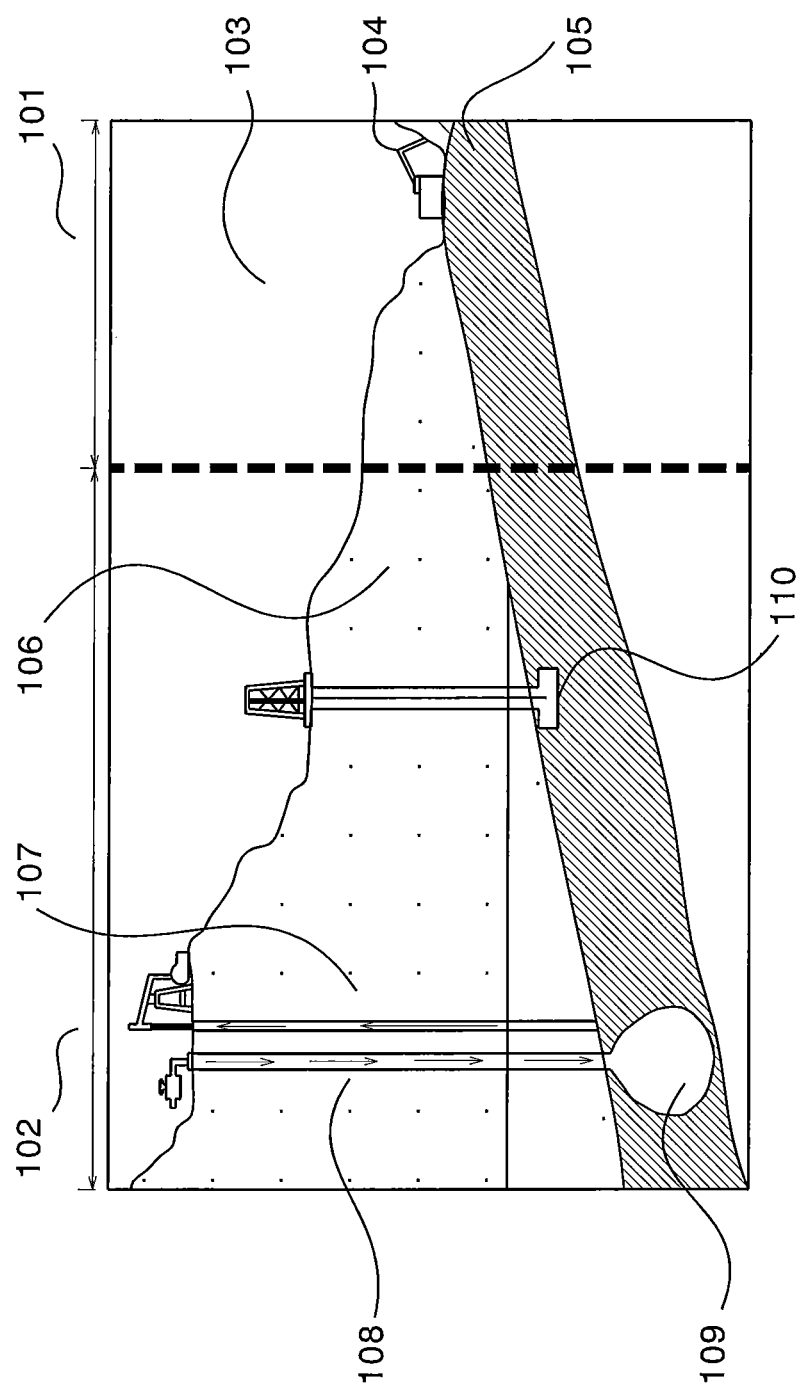
FIG. 1. Schematic showing the nature of the oil sands reservoir in Canada from World Deposits, Heavy Oil and Bitumen Recovery (Weiss, Fall 2011).
Figure 2:
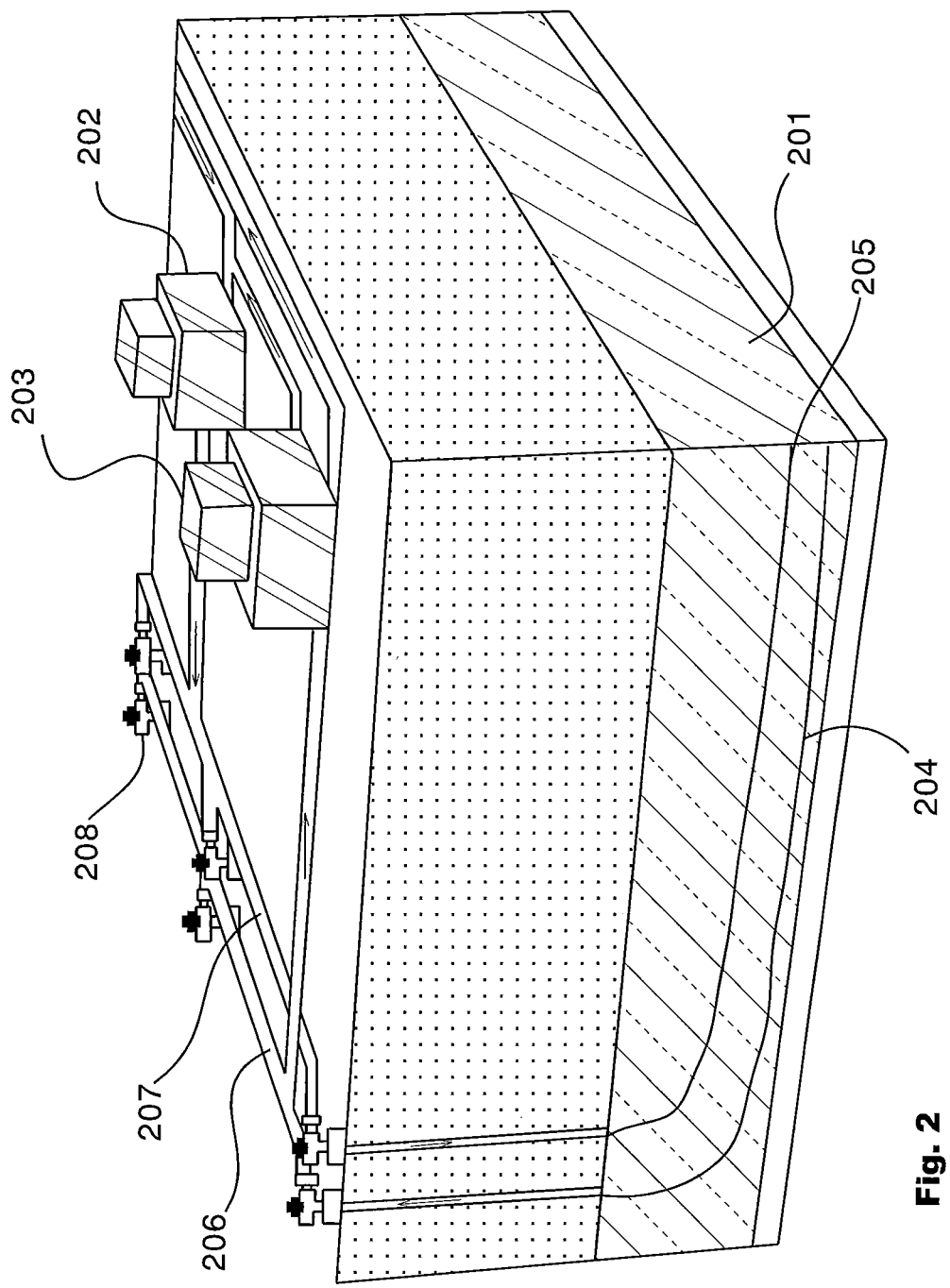
FIG. 2. Schematic of SAGD.
Figure 3:
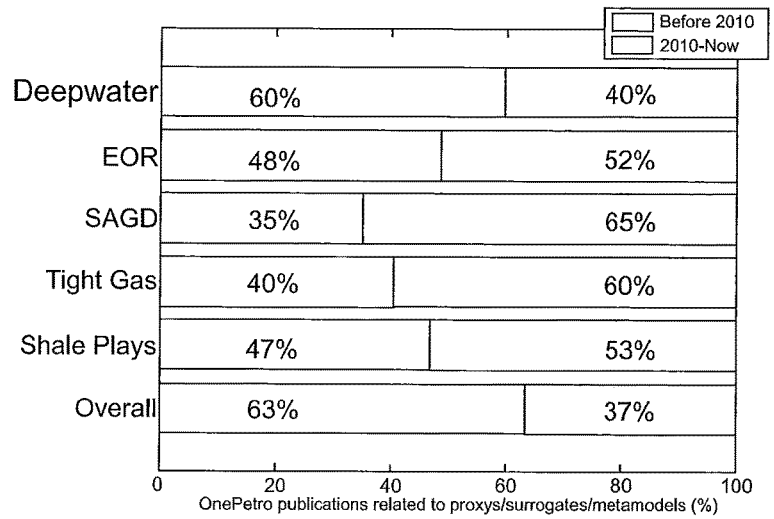
FIG. 3 displays the number of publications related to proxies, surrogates and metamodels for the different oil reservoirs from pre-2010 and 2010-now in the OnePetro database.

The present invention is exemplified with respect to the figures and the following discussion regarding SAGD. However, this is exemplary only, and the invention can be broadly applied to any hydrocarbon or hydrocarbon recovery process. The following discussion and figures are intended to be illustrative only, and not unduly limit the scope of the appended claims.

The disclosure provides novel methods, systems and devices for modeling hydrocarbon production. Specifically, growth modeling methods are combined with data driven models to efficiently model production and forecast with a quick turn around time.

When producing oil from the subsurface, engineers often build a detailed 3D geological model of the oil reservoir. This numerical representation of the underlying rocks and fluids is then used to predict the flow behavior, under a given set of controls. The controls usually represent the amount of pressure or flow that is imposed at the producing and injecting wells.

Due to the noisy and sparse nature of seismic data, core samples, and well logs, uncertainty is an inherent characteristic of any geological model. The unique true distribution of reservoir properties is usually unknown. To quantify the uncertainty in a geological model, geo-statistical methods can be used through the construction of multiple equally probable realizations of reservoir properties.

Simulation of oil production from SAGD is a very difficult task, because it involves reproducing complex physical phenomena and strong nonlinearities (e.g. large variation of fluid properties with temperature). However, because SAGD is economically more costly than conventional oil production, it is an ideal candidate for optimization via modeling.

Computer analysis of production for an oil reservoir is usually divided into two phases, history matching and prediction. When an oil field is first discovered, a reservoir model is constructed utilizing geological data. Once the petroleum field enters into the production stage, many changes take place in the reservoir. For example, the extraction of oil/gas/water from the field causes the fluid pressure of the field to change. Injection of steam and fractures can cause mobility to change. Various procedures can affect porosity. In order to obtain the most current state of a reservoir, these changes need to be reflected in the model. History matching is the process of updating the reservoir descriptor parameters in a given computer model to reflect such changes, based on production data collected from the field. Production data essentially give the fluid dynamics of the field; examples include water, oil and pressure information, well locations and performances. Thus, reservoir models use empirically acquired data to describe a field.

In the history matching phase, geological data and production data of the reservoir and its wells are used to build a mathematical model which can predict production rates from wells in that reservoir. The model is generally a "black box" with unknown parameters. Given the water/oil rates and other production information collected from the field, the model is modified to identify these unknown parameter values such that the reservoir gives flow outputs matching the production data. This takes time because more than one combination of reservoir parameter values give the same flow outputs, a large number of well-matched or "good" reservoir models needs to be obtained in order to achieve a high degree of confidence in the history-matching results. Furthermore, analysis of the production of a petroleum reservoir is an ongoing process. These models are constantly being rerun and further tuned to improve their ability to match newly gathered production data.

As expected, the above-described process of history matching for prediction is a very time consuming process and can be very inefficient if the effect of multiple unknown parameters have to be investigated.

Figure 4:
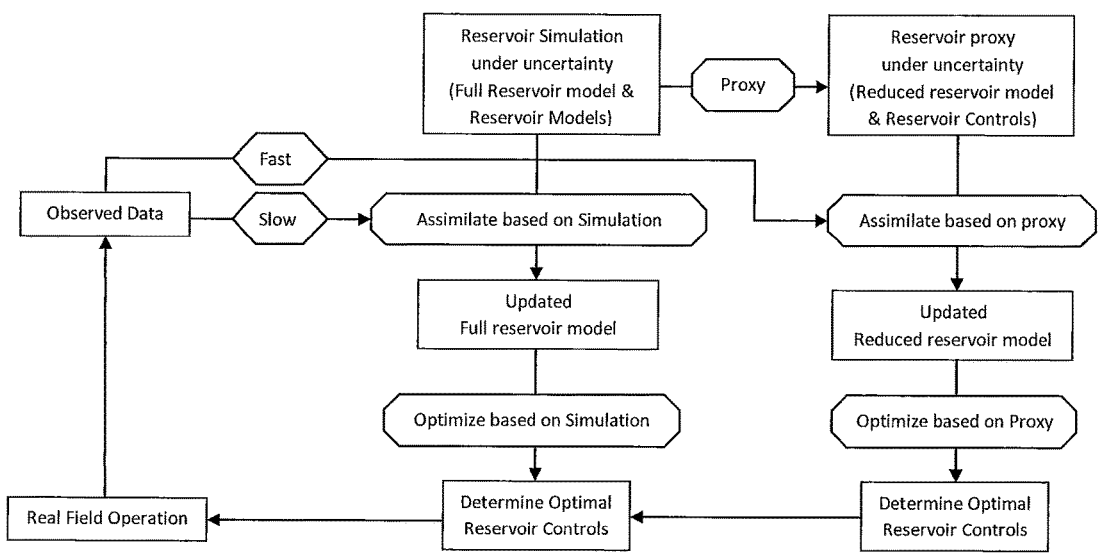
FIG. 4 displays a schematic of the steps taken to prepare a reservoir simulation and surrogate under uncertainty.

The presently described method overcomes the time consuming approach by developing surrogate models of a reservoir using growth function models and the data-driven models. FIG. 4 displays a flow chart of steps generally taken to determine optimal reservoir controls. A full model simulation, such as that described above, is used to develop a surrogate with reduced reservoir conditions. Data assimilation tools, such as Kalman filters and smoothers, track uncertainties and update both the simulation and surrogate models according to timely incoming data. The reservoir controls are optimized based on these models. New data from real field operations using the new parameters is then collected to continually evolve the models.

However, there is no tool for capturing trends and physics involved with each reservoir such that meaningful predictions can be made. Having this information would be especially imperative because it would allow for proactive use of the models in the field and lead to more reliable decisions.

In the presently disclosed method, growth modeling and data driven modeling are used to build two surrogates that can be combined for predictive modeling and forecasting. The analytical models capture trends in production process by incorporating underlying physics theories. The data-driven models capture the discrepancy between the analytical models and the actual physics of the well, i.e. between real field data and the computed data from the analytical model.

The two surrogates can be combined because deterministic models, such as growth function models, require an accurate estimate of modeled properties (e.g. multiphase flow, transport through porous media, etc), especially those that affect the estimation and location of recoverable reserves, in addition to revealing true subsurface flow characteristics under various injection scenarios. As such, there is a need to improve accuracy while reducing the uncertainty associated with reservoir characterization. This is where the data-driven models are used. The data driven surrogate can be used as a corrections tool for the growth model based surrogate. This will allow for modification of the growth model for more accurate predictions.

Analytical models, such as growth functions, are mathematical models that have a closed form solution, i.e. the solution to the equations used to describe changes in a system can be expressed as a mathematical analytic function. Simple analytical models provide an important tool for deconstructing the mechanisms underlying complex physical processes, for interpreting numerical simulations and, for making connections to observational or laboratory data. Thus, when applied to new data or records, an analytical model can predict outcomes based on historical patterns.

Growth curve models are a type of analytical model commonly used in biology and health sciences, such as population dynamics (of e.g., cells or humans). Most models are based on the logistic growth curve or Verhulst model, wherein the e.g. population dynamics has an exponential growth:

$$\frac{dN}{dt} = rN$$

and the solution to the model is:

$$N(t) = N_0 e^{rt}$$

wherein r is the intrinsic growth rate (or proportionality constant) and represents growth rate per capita in this particular example, t is time, and N is the growing variable of interest, in this case population. The resulting growth model is sigmoidal and shows an initial stage of growth having an exponential nature, which slows as saturation begins and finally stops at maturity.

Growth function models based on the initial Verhulst equation are still very prominent today. Tsoularis (2001) and Fekedulegn (1999) both detail the variety of growth curves that have been developed for population dynamics, general biological growth, and forestry. WO2013041670 details the use of a logistic growth model to model the growth kinetics for *P. putida* while it produces rhamonolipids. US20090119020 describes a method for processing data representing growth curves to determine whether valid or signification growth has occurred. However, these types of models are mainly used for science and some economic evaluations, and have not yet been applied to oil and gas simulations.

Data-driven techniques such as neural networks or polynomial regressions and variations thereof have found use in modeling SAGD. However, a disadvantage of these models is that they do not include the physical structure of the reservoir in the model. Instead, these models are based on the analysis of the data characterizing the system under study. In the present method, a data driven technique is used to build models of the error probability distribution for the physical-based analytical model. Thus, it is being used as a uncertainty prediction model.

The proposed method seeks to bridge the analytical models with data driven techniques by capturing the main trend of the process into an analytical and monotonic increasing function, such as cumulative production, and performing data driven corrections to the discrepancies that field data and computed data may show.

In the present method, the rate and shape of the growth function model can be correlated to geological, geometrical and operational factors determining SAGD steam chamber growth and shape. In turn, this steam chamber features can be associated with e.g. cumulative production and rates.

The difference in these two modeling methods used in the present disclosure is illustrated below in Tables 1 and 2:

TABLE 1

General Information Regarding Modeling Approach to SAGD predictions

| Approach | Type | Opportunities | Challenges | Predictability |
|---|---|---|---|---|
| Data-Driven Time Dependent Model | Time series nonlinear system identification | Powerful device to improve analytical model predictability | Attain sufficient & representative samples may be an issue | Suitable to predict random/nonlinear effects |
| Growth Models | Analytical | Behavior can be related to physical quantities | Reliability under complex geological, geometrical and operational constraints | Suitable to predict relevant trends |

TABLE 2

Model Features

| Feature | Data Driven Model | Growth Model |
|---|---|---|
| Accuracy | Highly Accurate (universal approximators) | Accurate (Capable of capturing most relevant trends) |
| Physics | Black-Box (not obvious relation with the underlying physics) | Physical quantities can be related to coefficients |
| Suitability for UQ, sensitivity analysis and optimization | Lack of explicit forms, need to rely on derivative-free methods (e.g., PSO, MCMC, . . . ) | Explicit analytical expressions such as derivatives and posterior distributions. Suitable for gradient-based optimization. |
| Implementation | Need specialized software (lots of public resources available) | Suitable to be implemented in any platform |
| Applicability to higher complex physics | Suitable to capture a wide range of nonlinearity due to increasing physics complexity | Limited range |
| Computational performance | Order of magnitude faster than original simulation model | Order of magnitude faster than simulation model and generally even faster than data-driven approaches |

The advantage of using growth curve based methods lies in their ability to use the underlying physics of the hydrocarbon reservoirs to predict SAGD performance. All of this can be done with a much faster turnaround time. Furthermore, the growth models do not required specialized software and can be implemented on most any platform, including open source platforms.

Figure 6:
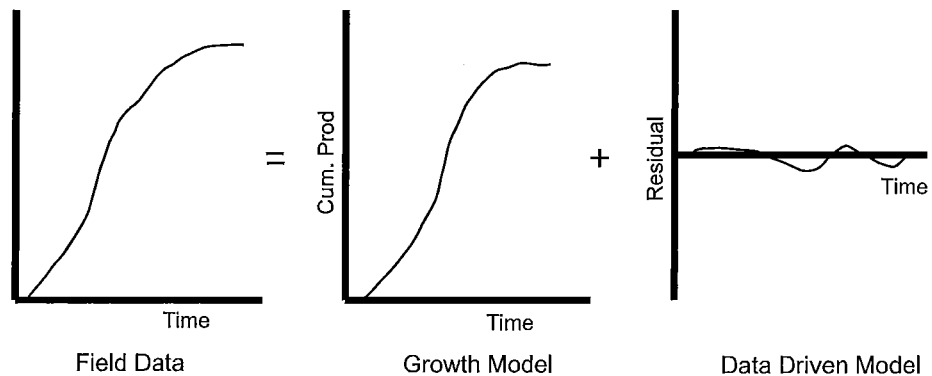
FIG. 6 displays a simplified summary of the present method, wherein the combination of a growth model and a data driven model will accurately predict a reservoir product such that the model can perfectly describe the field data.

Another advantage is the ability to combine the growth model with a data-driven model. FIG. 6 shows the idealized result of a surrogate according to the combined models. In theory, the growth model and the corrections from the data driven model will accurately predict the field data.

Figure 5A:
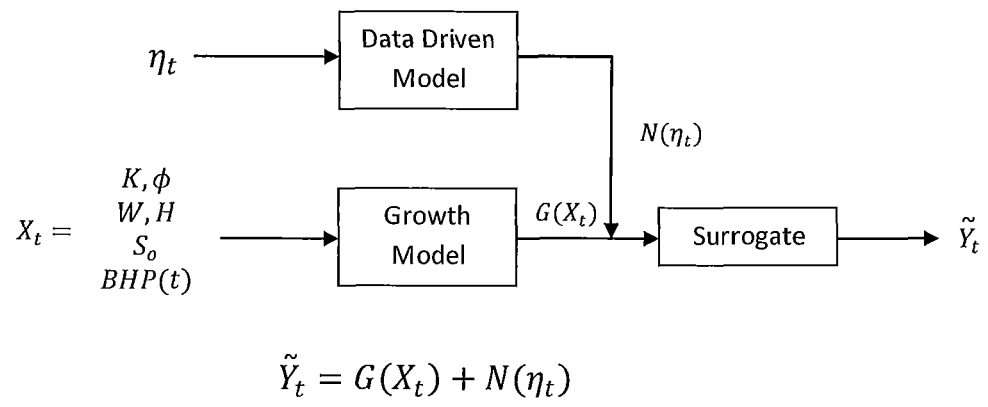
FIG. 5A-B display schematics of the present method as applied to (A) open loop and (B) closed loop wells.
Figure 5B:
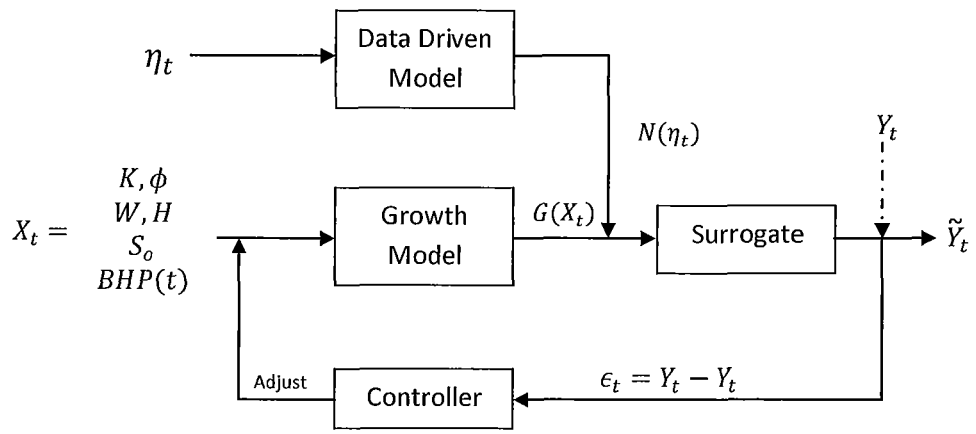

FIGS. 5A and 5B show the method of using the correction for an open loop and closed loop system, respectively. In the open loop system, the parameters of interest are modeled using a growth model to create a deterministic parametric surrogate and the field data is modeled to create the stochastic non-parametric model. These can be combined into a single surrogate model to predict performance response of the reservoir of interest. In a closed loop system, the surrogate model prediction can be compared with actual data ($Y_1$) and any discrepancies can lead to an adjustment of the growth model.

The method was applied to data collected from multiple SAGD operations owned by ConocoPhillips. A modified Gompertz growth function model, shown in FIG. 7, was found to have the best fit and prediction for the studied parameters in the examples described below. The particular model fits the data to the following equation:

$$y(t) = c \cdot e^{-ae^{-bt}} - c \cdot e^{-a} \quad \text{Equation 1}$$

Wherein for example, y is the cumulative oil production, t is time, e is the natural exponential function, and a, b and c can be associated with physical parameters, e.g., taken from the reservoir.

This particular growth model is based on three analytical coefficients, namely, a, b and c, that can be associated with physical parameters. In the experiments described below, coefficient a controls the growth rate, coefficient b controls the variation of the growth rate with respect to time, and coefficient c controls the y-scale of the cumulative oil production.

Figure 7:
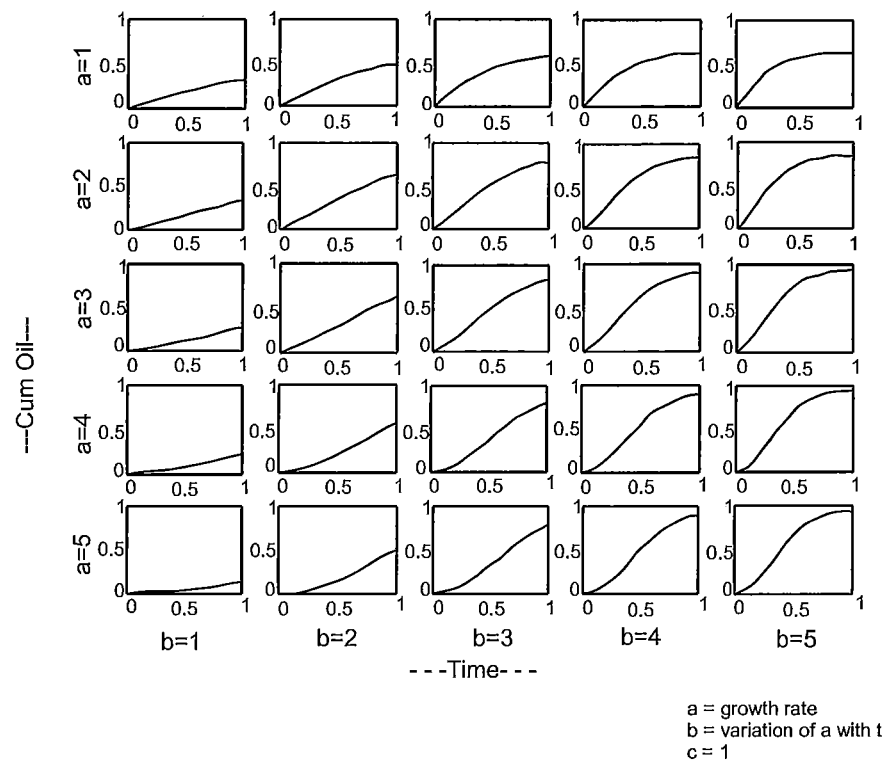
FIG. 7 displays a plot of showing CumOil (y) versus Time (x) using the modified Gompertz model of Equation 1, wherein coefficient "a" controls the growth rate, coefficient "b" controls the variation of the growth rate with respect to time, and coefficient "c" is set to a fixed value of c=1.

FIG. 7 shows CumOil (y) versus time (x) and illustrates the behavior of the model given by Equation 1 for a fixed value of c=1, and different values of coefficients a and b, wherein a is the growth rate and b is the variation in growth rate over time (see labeled axes).

The data driven model component can be optionally realized as a time-dependent model based on nonlinear system identification method designed to correct for residuals given by the mismatch between the original data and the fitting model.

Figure 8:
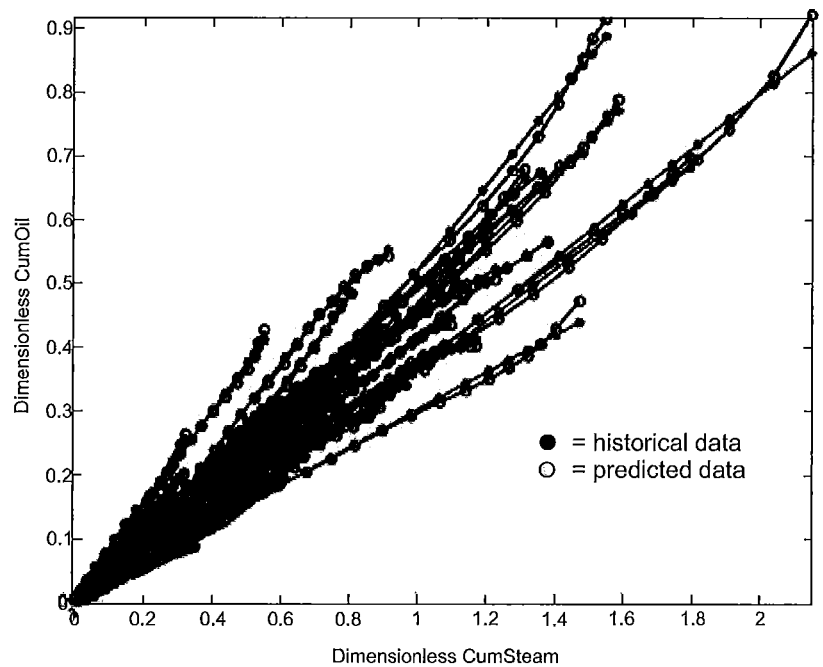
FIG. 8 displays a plot of CumOil v. CumSteam for 57 different well pairs, wherein open circles represent the actual data, and the closed clue circles are the predicted data fitted using the model herein. As can be seen, the predicted data closely tracks the historical data, and thus illustrates the flexibility of the method. Specific well pairs are selected and individually shown in FIG. 10-15 below.

The flexibility of fitting cumulative oil from cumulative steam performance profile using model Equation 1 is illustrated in FIG. 8 on field data obtained from different assets with each having a different production history. The number of fits corresponds to 57 different well pairs, wherein open circle data points represent historical data, and closed circles represent the predicted data using Equation 1.

The model in FIG. 8 did not rely on the data-driven component given the good quality of fit and the restricted number of sampled cases. While the growth function appears to be capturing the main production trends contained in the data, an optional data-driven component step can also be used to improve the quality of the fit and to capture the lower-order effects.

Figure 9:
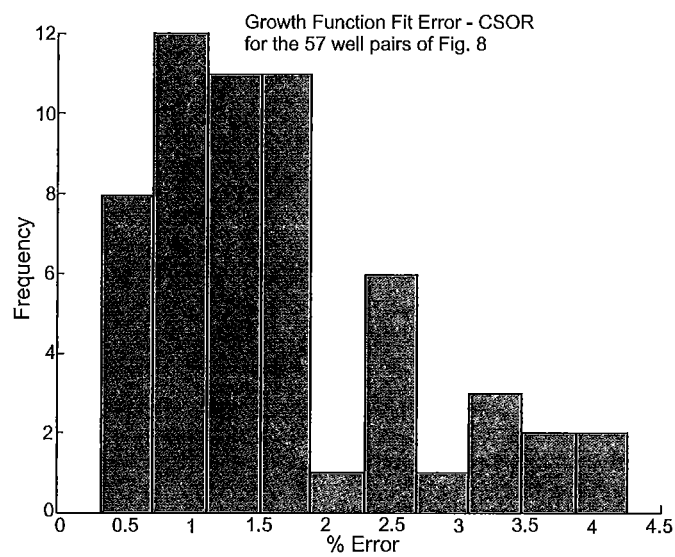
FIG. 9 displays a bar graph of % error versus frequency for the above 57 well pairs, and indicates the quality of the fit for cumulative steam and oil ratio (CSOR). The fitting was carried out with the aid of a nonlinear least squares method with bounded constraints and globalized via the Levenberg-Marquardt algorithm. As can be seen, the error rate was quite low (most ≤1.5%, and all <4.5%).

FIG. 9 indicates that the quality of the fit for cumulative steam and oil ratio (CSOR) ranges from 0.5 to 4.0 percent, which is very good given both the noise and the incidence of second order physical effects (e.g., pressure operation changes, sub-cooling control, downtime and coalescence) that may not be entirely captured by the proposed growth model. The fitting was carried out with the aid of a nonlinear least squares method with bounded constraints and globalized via the Levenberg-Marquardt algorithm. Note that end point of production may not be necessarily fitted with high accuracy as the main emphasis in probabilistic forecasting is to capture the overall cumulative oil production trend under parameter and observation uncertainty and ultimately, to minimize possible overfitting.

To evaluate probabilistic forecasting, three well pair cases from three different assets are considered from the set displayed in FIG. 8. These cases vary in geology, operational and reservoir geometrical conditions as well in production history. In the following, these cases are presented in increasing availability of history time (expressed in months of production). To validate the methodology, an early portion of the history is used as a base to perform the stochastic forecasts. The end of each of these sections of historical data is indicated with a solid yellow vertical line.

The input uncertainty is described by uniformly sampling one million combinations of values for growth parameters a, b, c and d. By means of a Monte Carlo procedure, fits yielding a relative error of 1% were collected to reconstruct the distribution of cumulative oil values at each month of predicted production. Once the distribution of these values are constructed, it is possible to estimate the probability associated to predict a cumulative oil value for a given amount of cumulative steam injected at any time. Forecast probabilistic bounds are indicated via Px percentiles, that is, the number of forecast that will fall below an x % of the cases. Hence, P0 and P100 provides the minimum and maximum bounds of cumulative oil that can be obtained, respectively; P10 and P90 provide practical bounds for low and high estimates of oil recovered and, P50, is the probability that the oil recovered will equal or exceeded the mean estimate.

In the following figures, P0 and P100 are indicated in green lines, P10 and P90 are indicated in dashed blue lines and P50 with a solid blue line. The best fit is indicated with a solid red line. Ideally, extrapolation of the best fit should represent the P50 trend of the forecast data and should stay as close as possible to future cumulative oil measured at the field. The data before and after history is indicated in black to illustrate the quality of the fitting and percentiles used to bound the forecast data.

Figure 10:
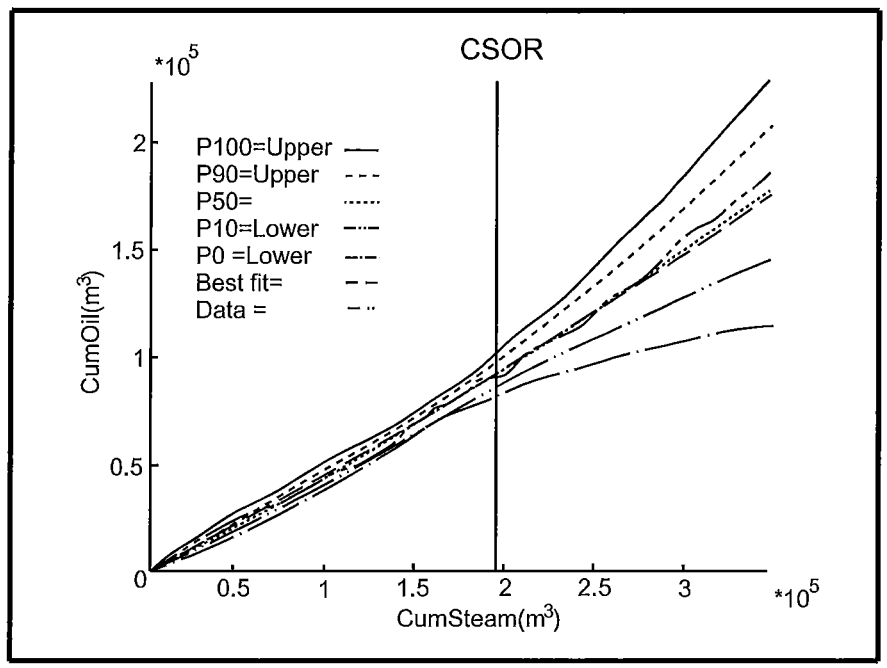
FIG. 10 displays the fitting and forecast of 20 months (over 1.5 years) of historical data and stochastic forecast of 17 additional months of production assuming a cumulative steam injection of 350,000 $Mm^3$ at the end of the period for a wellpair selected from FIG. 8. The end of the historical data is indicated with a solid yellow vertical line.
Figure 11:
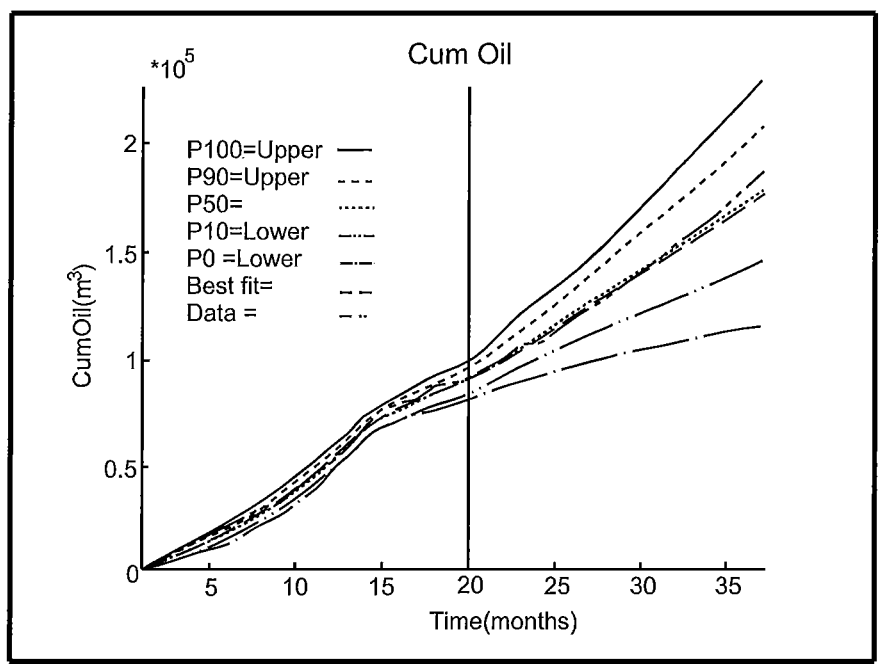
FIG. 11 displays a plot of cumulative oil as a function of time for the wellpair in FIG. 10.

FIG. 10 shows the fitting and forecast using 20 months (over 1.5 years) of historical data. Stochastic forecast were set to 17 additional months of production assuming a cumulative steam injection of 350,000 $Mm^3$ at the end of the period. The CSOR (Cumulative Steam/Cumulative Oil ratio) shows a nearly linear trend that is accurately captured by the modified Gompertz model. The extrapolation of the best fit during the history period, the mean of possible forecasts, namely P50, and the data are close to each other. The P10 and P90 estimates enclose almost in a symmetrical way these 3 trends, thus denoting a non-skewed Gaussian distribution for all possible forecasts. Similar conclusions can be drawn from cumulative oil as a function of time as depicted in FIG. 11. Despite the sudden change in cumulative oil production at 15 months, the trend is accurately predicted during the whole period of 37 months. This example shows that relative long-term predictions can be made from short historical data.

Figure 12:
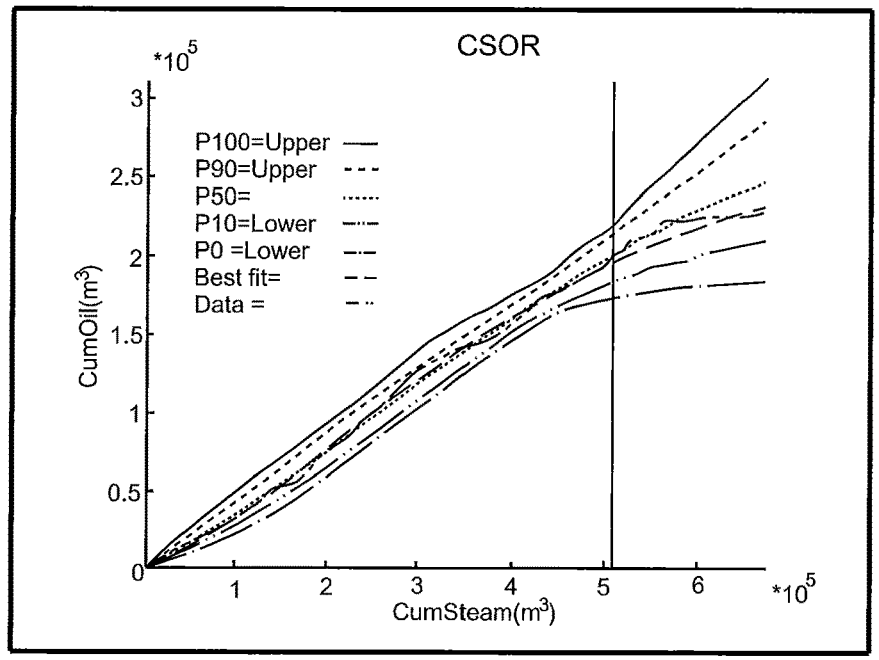
FIG. 12 displays the fitting and forecast of 50 months of historical data and stochastic forecast of 50 additional months of production for a wellpair selected from FIG. 8. The end of the historical data is indicated with a solid yellow vertical line.
Figure 13:
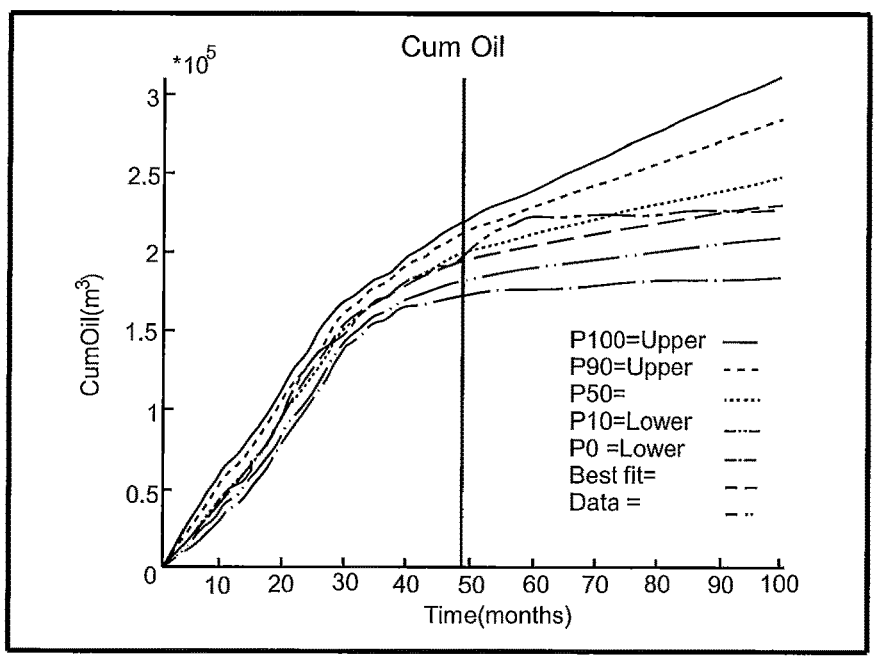
FIG. 13 displays a plot of cumulative oil as a function of time for the wellpair in FIG. 12.

FIGS. 12-13 show another cumulative oil prediction case as a function of cumulative steam injected and time, respectively. This case not only relies on a longer history than the previous case, but it also displays an unexpected change of trend right after the history of 50 months of production. The modified Gompertz growth model is capable of foreseeing an immediate decline of production after 60 months (5 years) and the uncertainty bounds P10 and P90 are still good enough to provide a reliable forecast for more than 50 additional months (over 4 years). The plateau in cumulative oil production is not exactly captured, but it is still close to the P50 and extrapolated best fitting curve. It is fair to say that as more history is incorporated before forecast, the decline in production will be increasingly captured by the growth model.

Figure 14:
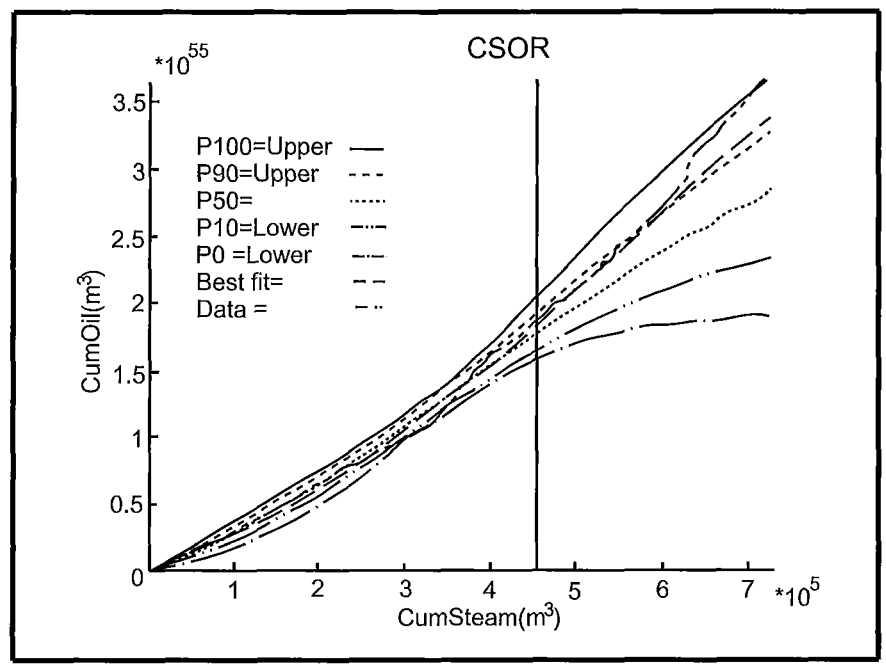
FIG. 14 displays the fitting and forecast of 100 months of historical data and stochastic forecast of 83 additional months of production for a wellpair selected from FIG. 8. The end of the historical data is indicated with a solid yellow vertical line.
Figure 15:
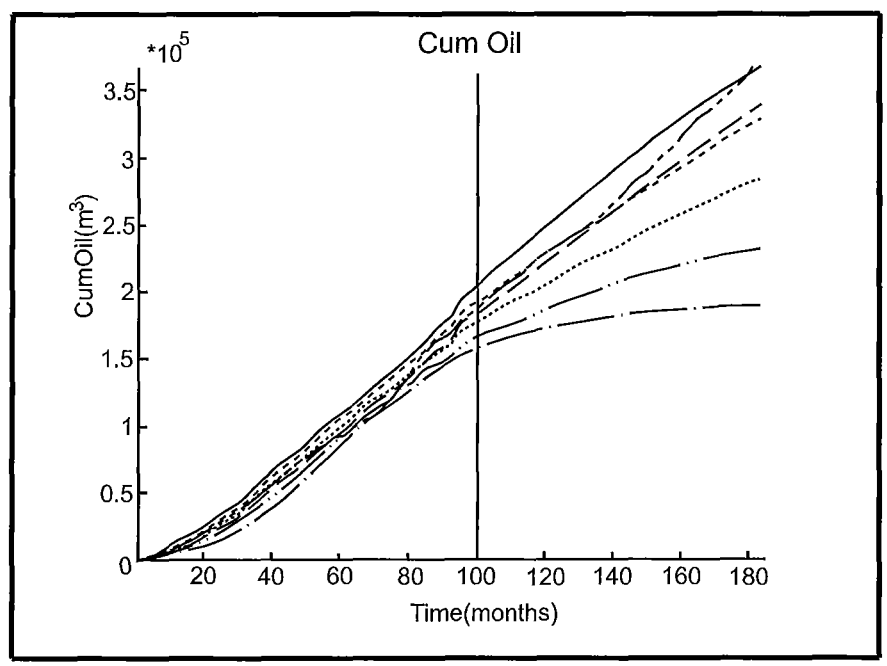
FIG. 15 displays a plot of cumulative oil as a function of time for the wellpair in FIG. 14.

A third case is shown in FIGS. 14-15. This case has even longer history (100 months) and longer forecast horizon (83 months) than the previous two cases. It also shows a new feature that challenges the prediction and it has to do with a sudden change of slope in cumulative oil production before the end of history. This change of slope may be due to sudden changes in reservoir pressure as a result of coalescence effects (communication of steam chambers by neighboring well pairs), bottom-hole pressure changes induced during operations or high contrast of permeability zones. In such situation the forecast tends to be conservative as the actual production exceeds the P90 estimate. Note that the best-fit line (red) follows the same trend as P90, which may indicate that many pessimistic models (i.e., with high relative error) were considered for the stochastic forecasting. Nevertheless, since the deterministic forecasting does a good job predicting the amount of cumulative oil, it is advisable to refine the probabilistic assessment of forecasts by lowering relative error tolerances. Also, the growth model is able to capture both increasing and decreasing changes of production as illustrated by this case and the previous one.

The following references are incorporated by reference in their entirety for all purposes.

Akin, S. 2005. Mathematical modelling of steam-assisted gravity drainage. *SPE Reservoir Evaluation and Engineering.* 8(5): 372-376.

Butler, R. M., and Stephens, D. J. 1981. The gravity drainage of steam-heated heavy oil to parallel horizontal wells. *Journal of Canadian Petroleum Technology.* 20(2):90-96.

Liang, L. 2005. An Analytical Model for Cyclic Steaming of Horizontal Wells. MSc Thesis. Stanford University, USA.

Nukhaev, M., et al., 2006, A New Analytical Model for the SAGD Production Phase. Proc., *SPE Annual Technical Conference and Exhibition,* 24-27 September, San Antonio, Tex., USA.

Reis, J. C. 1992. A steam-assisted gravity drainage model for tar sands linear geometry. *Journal of Canadian Petroleum Technology.* 31(10): 14-20.

Reis, J. C. 1993. A steam-assisted gravity drainage model for tar sands radial geometry. Journal of Canadian Petroleum Technology. 32(8): 43-48.

Tsoularis A., Analysis of Logistic Growth Models, Res. Lett. Inf. Math. Sci, (2001) 2, 23-46; ☐ Available online at http://www.massey.ac.nz/wwiims/~rlims Tsoularis A, Wallace J., Analysis of logistic growth models, Math Biosci. 2002 July-August; 179(1):21-55.

Fekedulegn D., Mac Siurtain M. P., and Colbert J. J. Parameter estimation of nonlinear growth models in forestry. Silva Fennica 1999; 33(4): 327-336.

Banks, R. B Growth and Diffusion Phenomena. Springer Verlag, 1994

Franses, Ph. H. B. F. (1994). Fitting a Gompertz curve. Operational Research Society. Journal, 109-113, available online at http://hdl.handle.net/1765/2077http://repub.eur.nl.pub/2077

Paine C. E. T., et al., How to fit nonlinear plant growth models and calculate growth rates: an update for ecologists, Methods in Ecology and Evolution 3(2): 245-256 (2012) available online at http://onlinelibrary.wiley.com/doi/10.1111/j.2041-210X.2011.00155.x/abstract.

Schepers A. W., et al., Comparison of simple neural networks and nonlinear regression models for descriptive modeling of *Lactobacillus helveticus* growth in pH-controlled batch cultures, Enzyme Microb Technol. 26(5-6): 431-445 (2000), available online at http://www.ncbi.nlm.nih.gov/pubmed/10713218.

Aplaydin, E. Introduction to Machine Learning, The MIT Press, $2^{nd}$ edition, 2010.

Whitten, I., Frank, E., Hall, M. A., Data Mining: Practical Machine Learning Tools and Techniques, Elsevier, 3er edition, 2011.

Bishop, C., Pattern Recognition and Machine Learning, Springer, 2006.

What is claimed is:

1. A method of improving hydrocarbon production from a reservoir, said method comprising
   i) obtaining temporal hydrocarbon production data from an enhanced oil recovery process;
   ii) fitting said temporal hydrocarbon production data with a growth function model to achieve the smallest residual error, as determined by a data driven model;
   iii) forecasting hydrocarbon production from said enhanced oil recovery process;
   iv) modifying one or more field operational factors of said enhanced oil recovery process to improve hydrocarbon production;
wherein said growth function model is a modified Gompertz model using Equation 1:

$$y(t) = c \cdot e^{-ae^{-bt}} - c \cdot e^{-a}$$

wherein y is the cumulative oil production, t is time, e is the natural exponential function, and a, b and c are physical parameters from the reservoir; and
   v) thereafter producing hydrocarbon using said modified one or more field operational factors.

2. An improved method of hydrocarbon production from a reservoir by:
   i) obtaining historical field data for a reservoir;
   ii) inputting reservoir parameters and said historical field data into a computer; and
   iii) modeling hydrocarbon production from said reservoir based on said parameters and historical data, the improvement comprising combining a growth function model and data driven model to form a surrogate model for said modeling step;
   iv) modifying one or more field operational factors to improve production based on said surrogate model;
wherein said growth function model is a modified Gompertz model using Equation 1:

$$y(t) = c \cdot e^{-ae^{-bt}} \cdot c \cdot e^{-a}$$

wherein y is the cumulative oil production, t is time, e is the natural exponential function, and a, b and c are physical parameters from the reservoir, and v) thereafter producing hydrocarbon from said reservoir using said modified one or more field operational factors.

3. The method of claim 1 or 2, wherein said data driven model is an auto-regressive moving average with exogenous inputs (ARMAX) model.

4. A method for improving a hydrocarbon production from a reservoir, comprising:
   a) obtaining production data for one or more production parameters for a reservoir;
   b) inputting said production data into a computer;
   c) applying a growth function model to said production data, wherein said growth function uses said one or more production parameters;
   d) applying a data driven model to a residual of said growth function model;
   e) combining said growth function model and said data driven model to form a surrogate model;
   f) predicting a future production of hydrocarbon with said surrogate model; and
   g) modifying one or more field operational factors to improve hydrocarbon production;
   wherein said growth function model is selected from a modified Gompertz model using Equation 1:
   $$y(t) = c \cdot e^{-ae^{-bt}} - c \cdot e^{-a}$$
   wherein y is the cumulative oil production, t is time, e is the natural exponential function, and a, b and c are physical parameters from the reservoir; and
   h) thereafter producing hydrocarbon using said modified one or more field operational factors.

5. The method of claim 4, wherein said growth function model is a tumor growth model.

6. The method of claim 4, wherein said growth function model includes a second growth function model selected from logistic, Schnute and Stannard, Logistic, Richards or a variation or combination thereof.

7. The method of claim 4, wherein said data driven model is selected from neural networks, polynomial regression, clustering, principal components analysis, partial least squares, auto-regressive integrated moving average (ARIMA), ARMAX radial basis function (RBF), fuzzy rule-based systems, and support vector machines.

8. The method of claim 4, said data driven model is an ARMAX model.

9. A method for hydrocarbon production from a reservoir, comprising:
   a) placing sensors at various stages of a hydrocarbon production process in a hydrocarbon-containing reservoir;
   b) determining a field production level in a hydrocarbon production process using said sensors;
   c) overlaying a growth function representation that simulates the production level within the hydrocarbon production process based on one or more parameters of said hydrocarbon-containing reservoir on a field production level representation;
   d) predicting a future production level within the hydrocarbon production process based on observation of the production growth of the growth function representation overlaid on the field production level representation;
   e) determining the discrepancies in said growth function representation and said production level using a data driven representation; and
   f) selectively modifying at least one parameter in the hydrocarbon production process based on said data driven representation,
   wherein said growth function model is selected from a modified Gompertz model using Equation 1:
   $$y(t) = c \cdot e^{-ae^{-bt}} - c \cdot e^{-a}$$
   wherein y is the cumulative oil production, t is time, e is the natural exponential function, and a, b and c are physical parameters from the reservoir; and
   g) producing hydrocarbon from said hydrocarbon-containing reservoir using said modified at least one parameter in the hydrocarbon production process.

10. The method of claim 9, wherein said parameters are geological, geometrical, operational or a combination thereof.

11. The method of claim 9, wherein said growth function model is a tumor growth model.

12. The method of claim 9, wherein said growth function model includes a second growth function model selected from logistic, Schnute and Stannard, Logistic, Richards or a variation or combination thereof.

13. The method of claim 9, wherein said data driven representation is selected from neural networks, polynomial regression, clustering, principal components analysis, partial least squares, auto-regressive integrated moving average (ARIMA), radial basis function (RBF), fuzzy rule-based systems, and support vector machines.

14. A method for improving performance in a hydrocarbon production, comprising:
   a) inputting one or more reservoir physical parameters into a computer;
   b) applying a growth function model to said one or more reservoir physical parameters;
   c) applying a data driven model to a residual of said growth function model;
   d) combining said growth function model and said data driven model to form a surrogate model;
   e) predicting a future production of hydrocarbon with said surrogate model; and,
   f) selectively modifying at least one parameter to improve the hydrocarbon production process based on said surrogate model,
   wherein said growth function model is selected from a modified Gompertz model using Equation 1:
   $$y(t) = c \cdot e^{-ae^{-bt}} - c \cdot e^{-a}$$
   wherein y is the cumulative oil production, t is time, e is the natural exponential function, and a, b and c are physical parameters from the reservoir; and
   g) producing hydrocarbon using said modified at least one parameter in the hydrocarbon production process.

15. The method of claim 14, wherein said growth function model is a tumor growth model.

16. The method of claim 14, wherein said growth function model includes a second growth function model selected from logistic, Schnute and Stannard, Logistic, Richards or a variation or combination thereof.

17. The method of claim 14, wherein said data driven model is selected from neural networks, polynomial regression, clustering, principal components analysis, partial least squares, auto-regressive integrated moving average (ARIMA), ARMAX radial basis function (RBF), fuzzy rule-based systems, and support vector machines.

18. The method of claim 14, wherein said said data driven model is an ARMAX model.

* * * * *